April 15, 1958 A. WIEBERDINK 2,831,053

COLOUR-TELEVISION RECEIVER

Filed May 26, 1954

INVENTOR
ATE WIEBERDINK
BY [signature]
AGENT

United States Patent Office 2,831,053
Patented Apr. 15, 1958

2,831,053

COLOUR-TELEVISION RECEIVER

Ate Wieberdink, Eindhoven, Netherlands, assignor, by mesne assignments, to North American Philips Company, Inc., New York, N. Y., a corporation of Delaware Application May 26, 1954, Serial No. 432,473

3 Claims. (Cl. 178—5.4)

Figures 1, 2A, 2B, 2C, 2D:
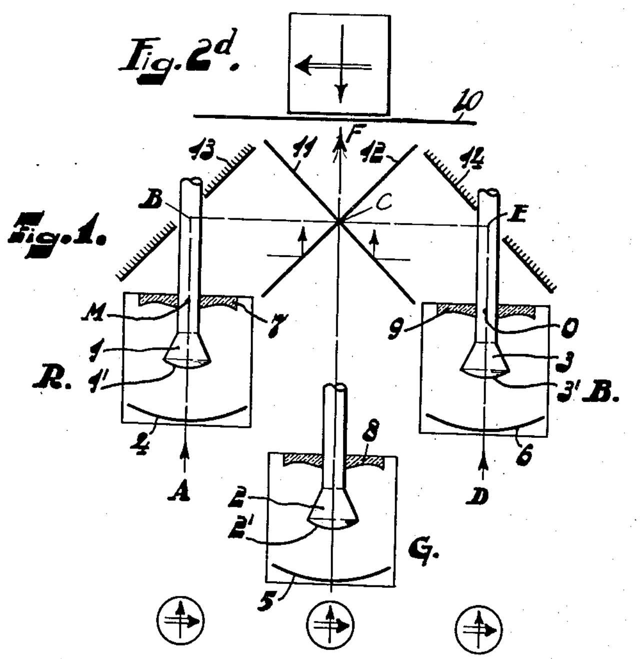

A colour-television receiver is known, which comprises three cathode-ray tubes, the screens of which are projected by optical means onto a common projection screen. In such a receiver the images from the cathode-ray tubes must coincide with one another on the screen, in order to obtain an accurate reproduction of the incoming image. When the receiver is installed, this may be carried out by means of adjusting members which render manually adjustable the tubes and/or the associated optical means relative to one another and relative to the screen.

If in a given position of the receiver relative to the surroundings the adjustment of the three images to the common projection screen is as accurate as posible, so that in this position of the receiver an optimum image is obtained on the screen, it has been found that, if the receiver is displaced or removed from its initial position, the initially very accurate adjustment at the projection screen is degraded and the three images from the cathode-ray tubes, subsequent to the displacement of the receiver, no longer coincide or register accurately. This means that the quality of the image visible on the screen is affected to a greater or smaller extent by this displacement of the receiver. In the new position of the receiver the three images from the cathode-ray tubes could be caused to coincide accurately again by means of the adjusting members, but, of course, this is a comparatively complicated manipulation which costs much time, since this adjustment requires, in general, the assistance of one skilled in the art.

The present invention has for its objective to obviate this disadvantage. Since the disadvantage stated above is presumably due to the effect of particular homogeneous magnetic fields, for example the earth's magnetic field, the colour-television receiver according to the invention has the feature that it comprises three substantially parallel, equally directed cathode-ray tubes, the screens of which are reproduced by optical means on a common projection screen in a manner such that the images from these cathode-ray tubes coincide on this projection screen, while each of the cathode-ray tubes in this receiver with the associated electric elements are arranged in a manner such that the image on each of the tube screens can be caused to coincide with the image on each of the other tube screens by an imaginary parallel displacement to itself.

It has been found that by this arrangement of the cathode-ray tubes and the arrangement of the electric elements associated with the tubes the disadvantage stated in the known receivers, when they are displaced, no longer exists.

One embodiment of the colour-television receiver according to the invention has the feature that, while each of the cathode-ray tubes co-operates with a hollow spherical mirror and a correction element arranged substantially in the centre of curvature of this mirror to obviate the spherical aberration of this mirror, the axis of the image beams of two of the cathode-ray tubes, by two reflections on flat mirrors, of which one is formed by one of two dichroid mirrors arranged at an angle, is displaced parallel to itself, after which it coincides at least substantially with the straight axis of the image beam of the third cathode-ray tube.

An arrangement requiring comparatively little space is obtained, if with the two cathode-ray tubes, of which the axis of the image beams are displaced parallel to themselves, the first flat mirror is arranged between the hollow spherical mirror and the correction element to obviate the spherical aberration. It is thus at the same time achieved that the dichroid mirrors may be comparatively small.

The invention will be described more fully with reference to the accompanying drawing, in which two embodiments of the device according to the inventor are shown.

Fig. 1 is a plan view of a colour-television receiver and the associated projection screen.

Figs. 2*a*, 2*b*, 2*c* and 2*d* show diagrammatically the images on the image screens of the three cathode-ray tubes and on the projection screen associated with the receiver, the images being drawn as they are viewed by a spectator whose eyes are supposed to be in the plane of the drawing and below this plane, the spectator looking at the same time to the screens of the cathode-ray tubes and to the projection screen. Certain parts of the receiver are to be supposed broken away.

Figure 3:
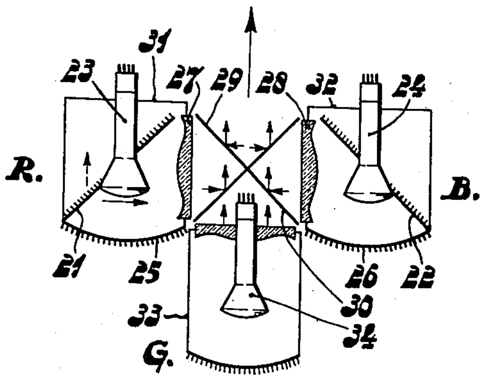

The construction of the colour-television receiver shown in Fig. 3 is less complicated than that shown in Fig. 1.

In the embodiment shown in Fig. 1 use is made of three cathode-ray tubes 1, 2 and 3, each of which co-operates with a hollow spherical mirror 4, 5 and 6 respectively, the centre of curvature of which lies in the axis of the associated tube at M, N, and O respectively. The image screens 1', 2' and 3' of the tubes 1, 2 and 3 respectively lie in the object plane of the mirrors 4, 5, and 6 respectively. Reference numerals 7, 8 and 9 designate the elements to correct the spherical aberration of the mirrors 4, 5 and 6 respectively.

For each of the tubes 1, 2 and 3 the associated spherical mirrors (4, 5 and 6 respectively) and the associated correction elements (7, 8 and 9 respectively) serve as optical reproducing systems. On a common projection screen 10, which is spaced apart farther from the further parts of the system than is indicated in Fig. 1, images of the screens 1', 2' and 3' of the cathode-ray tubes are reproduced owing to the presence of these optical systems through the intermediary of the mirror surfaces to be described hereinafter, the images coinciding on the projection screen.

As is evident from Fig. 1, the receiver comprises two intercrossing dichroid mirrors 11 and 12 arranged at right angles to one another and, moreover, the mirrors 13 and 14, which are parallel to the dichroid mirrors 12 and 11. The plane of the mirror 13 in the embodiment shown is at an angle of 45° to the axis A—B of the image beam from the mirror 4. Owing to this arrangement of the mirror 13 the axis A—B is shifted through an angle of 90°, so that this image beam assumes the direction B—C.

In a similar manner the plane of the mirror 14 is at an angle of 45° to the axis D—E of the image beam from the mirror 6. Thus the axis D—E is displaced through an angle of 90° into the direction E—C.

With respect to the dichroid mirrors 11 and 12 we may observe the following. It is assumed that the tube 1 emits an image beam in the red colour range, tube 2 an image beam in the green range and the tube 3 an image beam in the blue range. The dichroid mirror 12 reflects red light and is transparent to colours having a different wave length. However, the dichroid mirror 11 reflects blue light and is pervious to other wave lengths than that of blue light. If the red signal is supplied to the tube 1, the green signal to the tube 2 and the blue signal to the tube 3, these signals forming part of the incoming image of the receiver, the three tubes will project simultaneously a red, green and blue image. If it is assumed that the spaces between the screens 1′, 2′ and 3′ and point C are equal, the image beam from tube 1 will be reflected substantially completely by the mirror 13 and be then deflected into the direction B—C to the dichroid mirror 12, reflecting red light and be deflected into the direction C—F to the screen 10. This beam is absorbed little by the dichroid mirror 11.

The blue tube 3 will direct its light to the spherical mirror 6, so that the image beam thus produced is deflected into the direction D—E to the mirror 14. The image beam deflected by this mirror will be directed with its axis E—C to the dichroid mirror 11, reflecting blue light and be thus deflected into the direction C—F and produce an image on the screen 10. Finally, the green image beam from tube 2, the beam being formed by the hollow spherical mirror 5, will be deflected, after having passed the correction element 8, into the direction G—C and pass substantially unhindered the two dichroid mirrors 11 and 12. This tube produces also an image on the screen 10.

If the tubes and the associated optical means are positioned exactly relatively to one another, a particular image, shown in Fig. 2 is produced, constituted by the accurately coinciding images from the tubes 1, 2 and 3. A spectactor, viewing from the plane of the drawing from below the arrangement shown and if he could observe the screens 1′, 2′ and 3′ simultaneously, which is only possible if the spherical mirrors 4, 5 and 6 and the other elements hindering the view were broken away, sees the images on these screens of these tubes as shown in Figs. 2*a*, 2*b* and 2*c*. From a comparison of these images it follows that each of these images can be caused to coincide accurately with the image of each of the other tubes by a displacement parallel to itself. With such a displacement not only displacements parallel to the plane of the screen, but also forward and backward displacements are to be considered. This property of the receiver according to the invention ensures the possibility of displacing at will the receiver in a room without the risk of losing the accurate adjustment of the coinciding images forming the total image once obtained on the screen 10, owing to the presence of homogeneous, magnetic fields.

In the embodiment shown in Fig. 3 the mirrors 21 and 22, associated with the tubes 23 and 24 are arranged between the spherical mirrors 25 and 26, associated with these tubes, and the correction elements 27 and 28. It is thus achieved that the dichroid mirrors 29 and 30 can be arranged between the housings 31, 32 and 33 comprising the tubes 23, 24 and 34, so that the total arrangement is more compact. Moreover, the dichroid mirrors may be smaller in size.

What is claimed is:

1. A color television receiving apparatus comprising three cathode-ray tubes each having a central axis and a face on which a visible image in a different color may be produced, said three different colored images when combined producing a visible natural image, said tubes being substantially parallel to one another, all of said tubes facing in the same direction, a hollow spherical mirror and correction element associated with each of the images produced by the tubes for projecting same in the direction of the axis of each tube, a flat reflecting mirror associated with each of two of the tubes for reflecting the projected image thereof toward the axis of the third tube, said third tube having an optical path that includes its axis, two dichroid mirrors arranged on the optical path of the third tube for reflecting the projected images along said optical path, and a single projection screen aligned with said optical path of the third tube and arranged at right angles thereto, the images produced by said three tubes exactly coinciding on the screen to produce the visible natural image.

2. A color television receiving apparatus as set forth in claim 1 wherein the flat mirrors are each arranged between the hollow spherical mirror and the correction element associated with each tube.

3. A color television receiving apparatus comprising three cathode-ray tubes each having a central axis and a face on which a visible image in first, second or third different colors may be produced, said three different colored images when combined producing a visible natural image, said tubes being substantially parallel to one another, all of said tubes facing in the same direction, a hollow spherical mirror and correction element associated with each of the images produced by the tubes for projecting same in the direction of the axis of each tube, a flat reflecting mirror associated with each of two of the tubes for reflecting the projected image thereof toward the axis of the third tube, two right-angle-intersecting dichroid mirrors arranged parallel to said flat mirrors and on the axis of the third tube for reflecting the projected images along the axis of the third tube, the dichroid mirror extending parallel to the flat mirror of one of said two tubes reflecting the colored image produced by said first tube and transmitting the other colored images, the dichroid mirror extending parallel to the flat mirror of the other of said two tubes reflecting the colored image produced by said other tube and transmitting the other colored images, and a single projection screen optically aligned with the axis of the third tube and arranged at right angles thereto, the images produced by said three tubes being similarly arranged on the faces of the three tubes and exactly coinciding on the screen to produce the visible natural image.

References Cited in the file of this patent

UNITED STATES PATENTS

| | | |
|---|---|---|
| 2,590,240 | Epstein | Mar. 25, 1952 |
| 2,594,382 | Bedford | Apr. 29, 1952 |
| 2,594,383 | Bedford | Apr. 29, 1952 |
| 2,611,816 | Darke | Sept. 23, 1952 |

FOREIGN PATENTS

| | | |
|---|---|---|
| 467,195 | Great Britain | June 14, 1931 |
| 663,628 | Great Britain | Dec. 27, 1951 |

UNITED STATES PATENT OFFICE

CERTIFICATE OF CORRECTION

Patent No. 2,831,053 April 15, 1958

Ate Wieberdink

It is hereby certified that error appears in the above numbered patent requiring correction and that the said Letters Patent should read as corrected below.

In the heading to the printed specification, between lines 7 and 8, insert -- Claims priority, application Netherlands April 15, 1954--; column 1, line 41, for "costs much time" read -- is time-consuming and expensive --.

Signed and sealed this 19th day of August 1958.

(SEAL)
Attest:

KARL H. AXLINE
Attesting Officer

ROBERT C. WATSON
Commissioner of Patents